April 4, 1961
B. W. LOWELL
2,978,079
SECURING DEVICE FOR SPEAKER BAFFLES
Filed Oct. 11, 1956
2 Sheets-Sheet 1
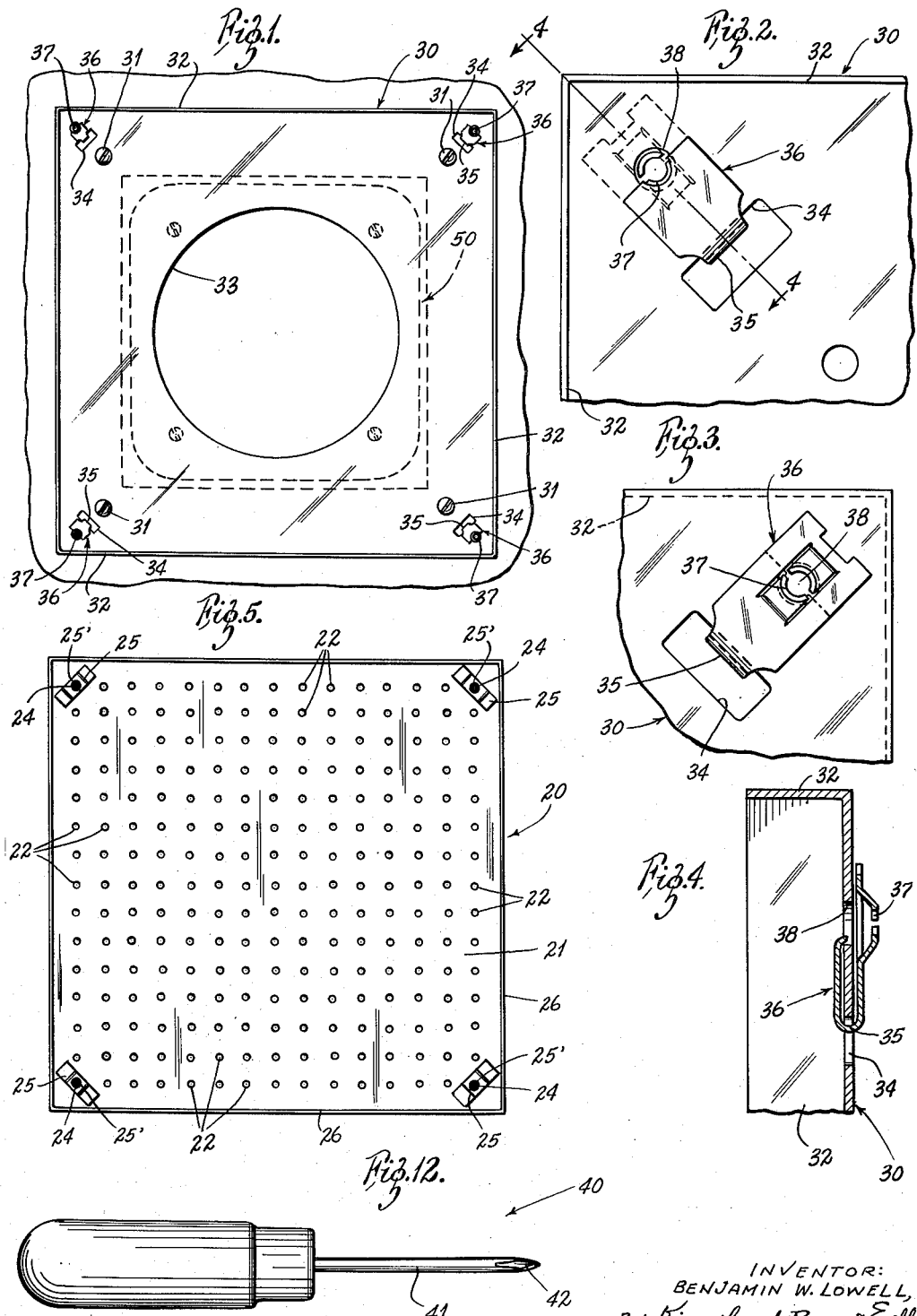
INVENTOR:
BENJAMIN W. LOWELL,
By Kingsland, Rogers & Ezell
ATTORNEYS

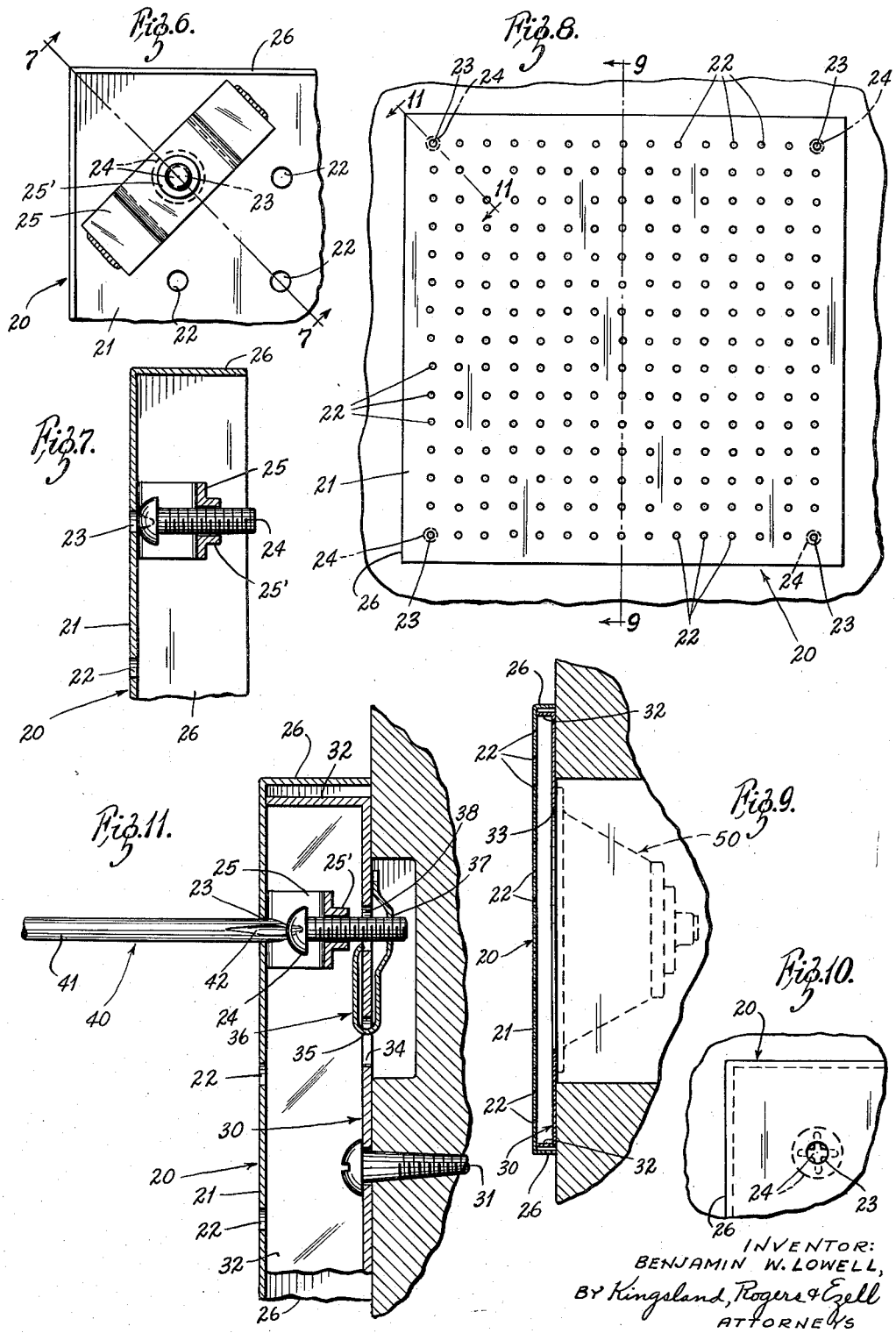

United States Patent Office 2,978,079
Patented Apr. 4, 1961

2,978,079

SECURING DEVICE FOR SPEAKER BAFFLES

Benjamin W. Lowell, 7819 Harter Ave.,
Richmond Heights, Mo.

Filed Oct. 11, 1956, Ser. No. 615,395

1 Claim. (Cl. 189—88)

This invention relates to improvements in securing devices, and in particular is concerned with a device for securing a metal grill to a base plate.

In the past, metal grills such as loudspeaker grills employed as baffles have been conventionally secured to supports on a wall or ceiling by screws, and the like. This has been found to be objectionable because of unsightly appearance, and also because of the ease with which the screws may be removed, by vandals and other unauthorized persons. Thus, in the past, the metal grills have been subject to easy removal and theft, as well as the loudspeaker structure behind the grills.

By means of the instant invention, there has been provided a securing device for a metal grill through the use of bolts which are invisible under normal observation. These bolts are mounted on brackets secured to the grill and are adapted for easy connection to a base plate provided with Tinnerman nuts which are especially adaptable in this invention. The heads of the bolts are centered under a grill hole in such a manner that there is automatic centering for a screw driver inserted through the grill hole from the exterior. In addition, the wall of the grill hole serves as a bearing support for full guiding and control of the screw driver in the securing operation.

Accordingly, there has been provided, through this invention, a base plate and a gril which may be very easily secured to one another by unskilled workmen in a minimum of time. The grill, once attached to the base plate, provides a secure protection for the speaker and presents a very pleasing appearance since no unsightly boltheads are presented to the viewer. Further, the securing arrangement insures against tampering and unauthorized removal since the heads of the bolts cannot be seen under normal observation and even if located, cannot be removed without a special tool.

Accordingly, it is a primary object of this invention to provide a securing device whereby a grill plate may be readily secured to a base in an improved manner.

It is a further object of this invention to provide a securing device whereby a grill may be secured to a base in which securing bolts are hidden from normal observation.

Still another object of this invention is to provide a grill plate having a securing means in which securing bolts are carried upon attaching means on the grill plate and in which the grill plate may be readily attached to a securing base provided with adjustable Tinnerman nuts and in which the securing operation may be carried out from the exterior of the grill plate.

Yet a further object of this invention is to provide a means for securing a grill plate to a base in which securing bolts are carried by the grill plate with the bolt heads disposed on the underneath side of the plate and in which there are guiding means provided by the walls of a grill hole for the ready insertion and guiding of a screw driver into the head of the bolts.

Still a further object of this invention is to provide a grill plate having means for carrying securing bolts on the underneath side thereof, and in which the grill plate may be readily secured to a base plate having Tinnerman nuts whereby the heads of the bolts after connection to the grill plate are hidden from view and in which the grill plate may be removed only through the use of a special Phillips screw driver.

Yet a further object of this invention is to provide a grill plate having means for securing it to a base in which the only operation required by a workman is the screwing of the bolt heads into the base after the plate has been properly positioned by guiding means thereupon.

Further objects of this invention will appear in the detailed description which follows and will be further apparent to those skilled in the art.

For the purpose of illustration of this invention, there is shown in the accompanying drawings a preferred embodiment. It is to be understood that these drawings are for the purpose of example only, and that although the securing device of this invention finds particular advantage for securing metal baffles, it may be applied in other securing applications, as will be well understood in the art. Likewise, although bolts are shown in the securing device, it is to be understood that screws and the like could be similarly employed.

In the drawings:

Figure 1 is a plan view of a base plate secured to a wall or ceiling ready for the reception of a grill with the securing device of this invention;

Figure 2 is an enlarged fragmentary view taken at the upper left hand corner of Figure 1, showing means for securing a Tinnerman nut to the base plate;

Figure 3 is an enlarged fragmentary view taken from the underneath side of Figure 2;

Figure 4 is a view in section taken on the line 4—4 of Figure 2;

Figure 5 is a bottom plan view of a metal grill provided in this invention;

Figure 6 is an enlarged fragmentary view taken from the upper left hand corner of Figure 5 showing the bolt securing and guiding device of this invention;

Figure 7 is a view in section taken on the line 7—7 of Figure 6;

Figure 8 is a top plan view of the metal grill of Figure 5;

Figure 9 is a view in section taken on the line 9—9 of Figure 8 showing the affixation of the grill to the base plate against a wall having a recessed speaker cone disposed therein;

Figure 10 is an enlarged fragmentary view taken from the upper left hand corner of the grill of Figure 8 partially showing the securing nut through the grill hole;

Figure 11 is an enlarged view in section taken on the line 11—11 of Figure 8 portraying the securing operation; and Figure 12 is a plan view showing a Phillips screw driver which may be employed in this invention.

The grill plate is best shown in Figures 5, 6, 7 and 8 and is generally indicated by the reference numeral 20. As shown, in Figure 8, it comprises a flat face 21 provided with a number of grill holes 22. It will be noted that the corner grill holes 23 are the ones under which the securing bolts 24 are disposed, as shown in Figure 7. These bolts are carried with their heads disposed between an attaching bracket 25 and the underneath side of the grill face 21. The bracket has a flanged bearing portion 25' which maintains the shank of the bolt straight in the securing operation. The grill plate is further provided with an inturned peripheral flange 26, as shown in Figures 6 and 7, which provides for guided insertion upon a base plate, as will be more particularly described with respect to Figure 11.

The base plate is generally indicated by the reference numeral 30 in Figure 1, and is shown attached to a wall or other convenient surface by attaching bolts 31. This plate has upwardly turned flanges 32 at its periphery which are adapted to be disposed on the interior of the flange 26 of the base plate, as shown in Figure 11, for ready insertion in a guided nesting manner. A central opening 33 is provided for a speaker cone with which this construction is adapted to be used, as will be well understood in the art.

The base plate is further provided with rectangular slots 34 at each of its corners for receiving the clip end 35 of a Tinnerman nut generally indicated by the reference numeral 36. The Tinnerman nut is in the form of a clip having a beveled nut portion 37 fitting over an opening 38 in the base plate, as is best shown in Figures 2, 3, 4 and 11. As shown in Figure 4, the Tinnerman nut may be moved slightly up and down for slight adjustment and self-guiding alignment with respect to the beveled end of the bolt.

A Phillips screw driver is generally indicated by the reference numeral 40 in Figure 12. This screw driver has a shaft 41 of uniform diameter with the usual grooves 42 being provided at the end. This screw driver is adapted to be used within the corner perforations 23 in close fitting relationship with the walls, which act as a guiding means to direct the grooved end 42 of the screw driver into the mating grooves of the Phillip head of the bolts 24.

Use

The grill plate is very simply secured to the base plate of this invention with the only operation being required of screwing in the securing bolts. This is because the securing bolts are maintained in the desired positional relationship by their brackets and the grill plate constitutes a partially assembled securing means by itself.

The base plate is first of all secured to a wall or ceiling surface or the like, with the opening 33 being placed in front of a speaker cone generally indicated by the reference numeral 50, as shown in Figure 9. The screws 31 will hold the base plate in position as shown in Figure 11 with the Tinnerman nuts 36 being received in a recess or other opening of the wall.

In the securing of the grill plate to the base plate, a self-alignment of the bolts over the Tinnerman nuts is provided by the relationship of the flanges 26 of the grill plate over and around the interior flanges 32 of the base plate as shown in Figure 11. With this relationship established, the Phillips screw driver 40 is inserted through a corner perforation opening 23 in the manner shown in Figure 11, and the Philliped bolt 24 is screwed into the Tinnerman nut 36. Any slight variations in dimensional relationship are accounted for through the slight adjustment possible of the Tinnerman nut 36 with respect to the opening 38 and the retaining slot 35. A self-guiding feature of the nut opening 38 into the opening 38 to receive the end of the bolt is provided through the tapering relation of the walls of the Tinnerman nut around this opening.

It will be noted that the flanged bearing portion 25' of the bracket 25 holding the Phillip bolt in position provides for guiding and movement of the bolt along a straight line, due to the depth of this bearing. Further, in the screw driving operation, it will be observed that the shaft 41 of the Phillips screw driver fits through the perforation opening 23 in close mating relation with the walls of the opening so that a bearing and guiding relationship is established as shown in Figure 11. In this manner, the Phillip bolt may be simply and easily screwed into the Tinnerman nut 36 around all four corners of the grill plate.

Once the securing of the Phillip bolts to the base plate has been established to drive the head of the bolt up tight to the interior of the bracket, a firm and secure connection is obtained. Through this arrangement, the head of the bolt is substantially hidden from view and a very close inspection is required for the eye to observe the head of the bolt through the grill perforation. Since the bolt heads are substantially hidden from view, they will not detract from the appearance of the grill plate. It will further be observed that these bolts may not be loosened once they are located by any unauthorized persons such as vandals, thieves, or the like, unless they have the special Phillips screw driver which is required to mate within the Phillip head of the bolts.

Various changes and modifications may be made in this invention, as will be apparent to those skilled in the art. Such changes and modifications are within the teaching and scope of this invention, as defined by the claim appended hereto.

What is claimed is:

In combination, a flat base member and a plate having a plurality of uniform circular perforations, said base member and plate having flanges which overlap when the base member and the plate are secured to a wall, means for securing said base member and plate to a wall in hidden relationship, said means comprising a bracket secured to the underside of the plate underneath one of said perforations for holding a bolt in slidable relation to said bracket with the head of the bolt retained in substantial spatial relation between the plate and the bracket, said one of the perforations acting as self guiding means for directing a screw driver into cooperating relation with the head of the bolt, said bolt being secured to the base with the bolt head substantially removed from said plate when the plate is secured to the base and bolt securing means provided on the flat base, said bolt securing means having self-aligning means receiving the end of the bolt comprising a plate-like member having a concave recess and a centered bolt receiving opening, said plate-like member being secured on said base through openings provided on the base and being relatively movable with respect to the base by the contact of the end of the bolt, said bolt being substantially removed from the plate when seated in the bolt receiving opening.

References Cited in the file of this patent
UNITED STATES PATENTS

| | | |
|---|---|---|
| 1,889,221 | Schleicher et al. | Nov. 29, 1932 |
| 2,018,346 | Busby | Oct. 22, 1935 |
| 2,170,739 | Tinnerman | Aug. 22, 1939 |
| 2,371,801 | Chester et al. | Mar. 20, 1945 |
| 2,611,633 | Webster | Sept. 23, 1952 |
| 2,706,127 | Stieglitz | Apr. 12, 1955 |
| 2,831,520 | Clarke | Apr. 22, 1958 |